Figure 1:
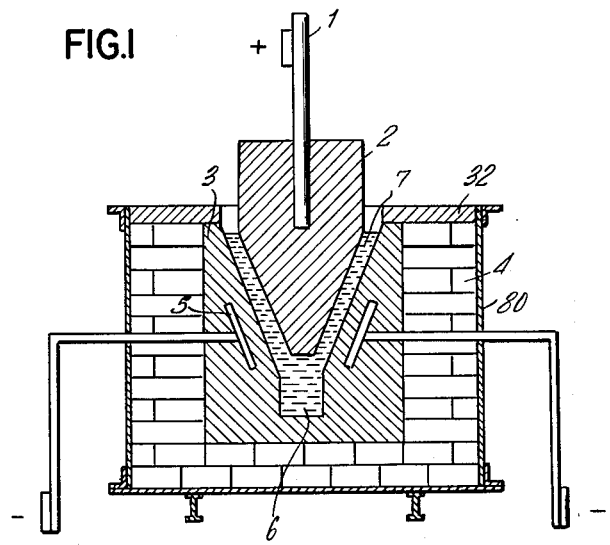

FIG. 8
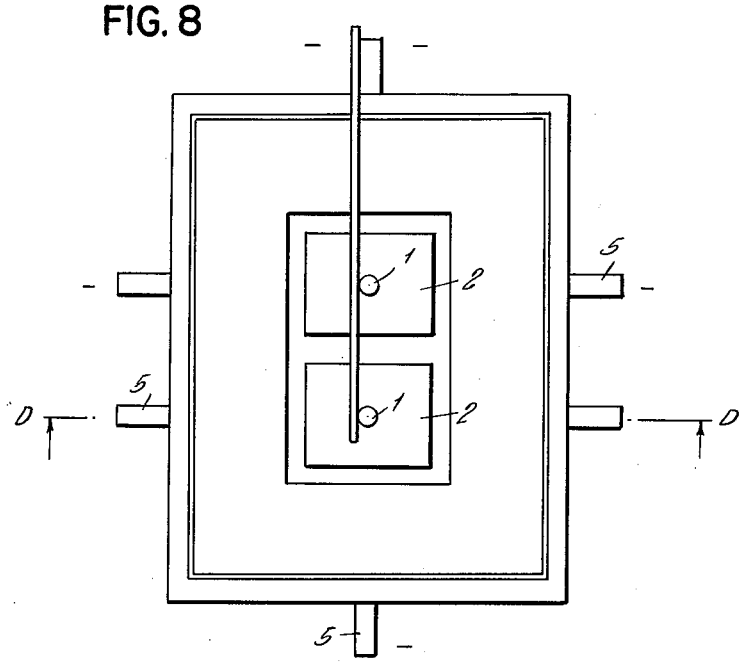
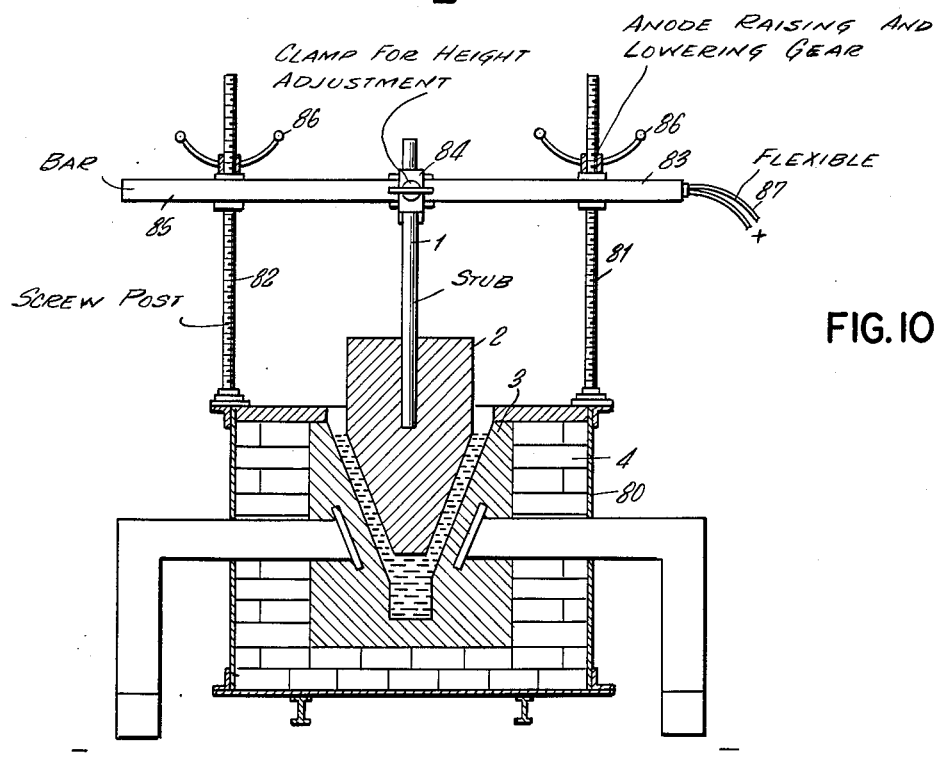
FIG. 10

United States Patent Office 3,067,124
Patented Dec. 4, 1962

3,067,124
FURNACE FOR FUSED-BATH ELECTROLYSIS, PARTICULARLY FOR ALUMINUM PRODUCTION FROM $Al_2O_3$
Alberto Vajna de Pava, Milan, Italy, assignor to Montecatini-Societa Generale per l'Industria Mineararia e Chimica, a corporation of Italy
Filed July 8, 1959, Ser. No. 825,779
Claims priority, application Italy July 24, 1958
9 Claims. (Cl. 204—244)

The present invention is directed to a new type of furnace for fused bath electrolysis. It particularly relates to a furnace employed in the production of aluminum from $Al_2O_3$ on a semi-industrial or industrial scale.

The single-cell furnaces employed today on large scale for the reduction of aluminum oxide dissolved in a fused cryolitic bath comprise a vat made of carbonaceous material usually having a large lower horizontal surface that forms the inner bottom of the vat, and having a small depth. The containing vat acts as a cathode on which the molten aluminum collects. In such conventional furnaces the anodic system is formed of one or more elements made of carbonaceous material extending horizontally and facing parallelly the horizontal level of liquid metal, and adjustably positionable at a small distance (3.5 to 9 cm.) therefrom. It should be noted that in such furnaces the bottom of the carbon vat always remains covered by a layer of molten aluminum whereon the cathodic reduction actually takes place. The aluminum produced is extracted periodically, but care is taken always to leave a layer of a few centimeters of residual metal on the carbon bottom. The layer is considered to be protective.

Due to the described shape of the conventional furnaces, it is practically impossible to reduce, appreciably, the dissipation of heat through the surface of the bath and through the surface occupied by the anode or anodes.

Hence, the conventional furnaces have many disadvantages, in structure and in operation, among which are the following:

(a) The considerable loss of heat through widely extending surfaces, particularly of the free surface of the bath;

(b) The loss of volatile components of the cryolitic bath from the large free bath surface;

(c) The great space requirement, so that extensive building areas must be occupied.

It is apparent, moreover, that the current density of the cathodic surface is considerably lower than that of the opposite total surface of the cross section of the anode or anodes. Particularly important in conventional furnaces are the ratio of the total weight of bath to the anodic area and the ratio of the total weight of bath to the amperage.

It has already been proposed to overcome said disadvantages of conventional furnaces by providing the electrolysis furnace with inclined anodic and cathodic walls, and by making the cathode, in particular, of inclined plates of zirconium carbide or titanium carbide. However, such plates are expensive and of very delicate and critical manufacture. This proposal is good evidence of the technical prejudice against the use, as cathode, of "blank" carbonaceous material, i.e. a prejudice against use of a cathode not covered by a protective layer of molten aluminum produced, which of course could not ordinarily be had on inclined cathodic surfaces. The prejudice exists because it was expected that the direct separation of aluminum would take place with low yield of aluminum in respect to current consumption. It should be noted moreover that, because of the direct contact of the cathode of zirconium or titanium carbide with the cryolitic bath and the metal, the aluminum produced is polluted by the zirconium or titanium, coming from the cathode.

Another suggestion for carrying out a fused bath electrolysis relates to furnaces having inclined anodes of "electrodic carbon" which are restorable from the bathside, that is, at the side where they face inclined graphite cathodes. However, the inter-electrodic space in furnaces of this type is limited on the sides by lateral walls made of refractory material, which is not an electrical conductor. Moreover, said refractory material must be inert against the action of the fused bath and is expensive, besides being electrolytically inoperative and unproductive. Furthermore, these known solutions or suggestions for employing inclined cathodic surfaces imply the use of anodes which act only on one or two surfaces, that is, those opposite the cathode, but not on the lateral surfaces, and they also require a strong heat-insulation of both lateral walls.

The present invention solves the problem of providing a furnace having inclined cathodic surfaces and retains the advantages of the said prior proposals of this type, while eliminating the described disadvantages, principally the electrochemically unproductive lateral walls. The general advantage in the use of inclined anodes facing inclined cathodic surfaces is that they provide a higher ratio between the upper dispersing surface, of the bath, cathode, and anode, and a minor active anodic surface, when compared with the analogous ratio present in the conventional type of furnace employing pre-baked anodes or Soederberg anodes with an entirely, or prevailingly, horizontal anodic surface facing the bottom cathode.

The electrolysis furnace of this invention employs an anode which is adjustable from the outside, at the top, and which can be either restored or replaced. It is characterized by a massive graphite vessel whose inner walls are inclined towards the center where they face an equal number of parallel anodic surfaces. Its form is preferably substantially in the shape of a pyramid or a frustum of a pyramid. The pyramid is square or rectangular if the vessel, as is usually the case, has the shape of a parallelepiped or cube. A sump is provided in the center of the vessel, in which the molten aluminum is collected as it is produced by the electrolytic process.

The present invention also overcomes another technical prejudice. It was to be expected that a massive graphite cathode, of similar volume or shape, would cause serious inconveniences such as irregular current distribution in the cathode, and the greatest current density on the cathode surface.

The anode is mobily supported from above in the conventional manner and may be of the semi-continuous pre-baked carbon type, or of the continuous Soederberg paste type, in all its varieties, provided that it is properly shaped.

The alumina feed to the electrolytic bath can be carried out without any difficulty, either by mechanical or manual methods, batch-wise or in a semi-continuous or continuous way.

The aluminum produced, which, as pointed out, runs down the cathode inclines and is collected in the sump (chamber or channel), can have a certain, or predetermined, current flow pass through it. The magnitude of such current will depend upon the ratio between the area of the lateral anodic surface and the surface area of the anode facing the bottom. The level metallic surface can therefore act as part of the total cathodic surface of the furnace, the latter surface however being prevailingly formed of the blank carbon or graphite cathode.

In conventional furnaces, a small fraction of the current may pass through the sides, of amorphous carbon, where it causes electrolytic reduction. In such case, however, the lateral useful surface, if any, in the better known furnaces that are employed in common industrial use, does not exceed 20% of the horizontal aluminum surface, aside from the fact that they are not made of graphite. Since this surface has an average distance of about seven times the interpolar distance commonly used, it will be evident that, in the conventional furnaces, only a small fraction of the total current will pass through the walls, whereas in the furnace of the present invention the current flows mainly through the inclined cathodic walls. Since in said conventional furnaces the sides are made of carbon and not graphite, they are subject to rapid corrosion, and side layers of solidified bath will eventually take their place.

As described more fully below, the furnace of the present invention can be fitted with several anodes for easier operation, by providing multiple anodes or several cells. The furnace can have several electrodes connected in parallel or in series, with anodes of the shape described. The cathodic graphite vessel may have a corresponding number of cavities, in the case of use of spaced anodic elements, the cavities being formed between massive partitions. It can be provided with two inner inclined opposed walls downwardly divergent, employed with or without electrically insulating partitions placed between the said two inclined walls, according to whether the respective electrode connections are in series or in parallel. In case of series connection, the electrical connection between the cathodes is provided by the continuity of the unitary graphite structure. For parallel connection of the cells, the electrical leads may be conveniently arranged above the furnace.

Figure 2:
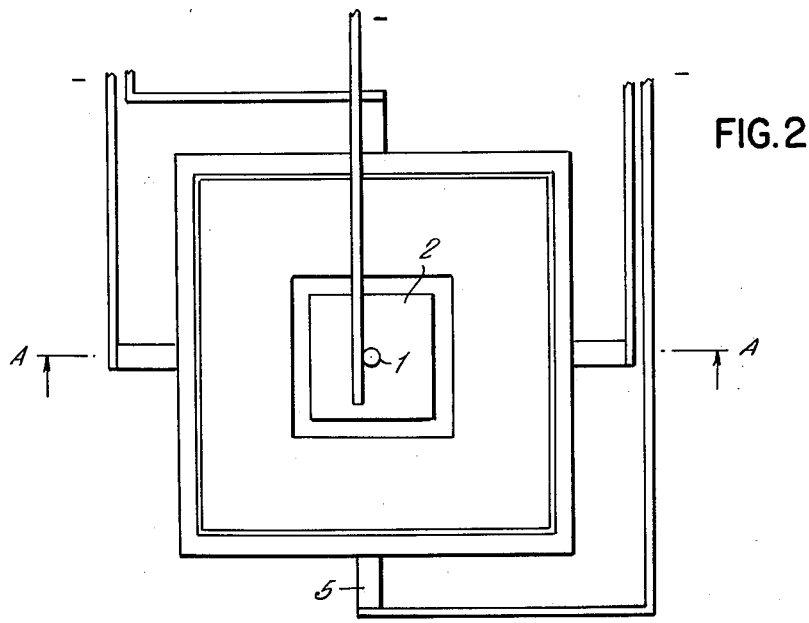
Figure 3:
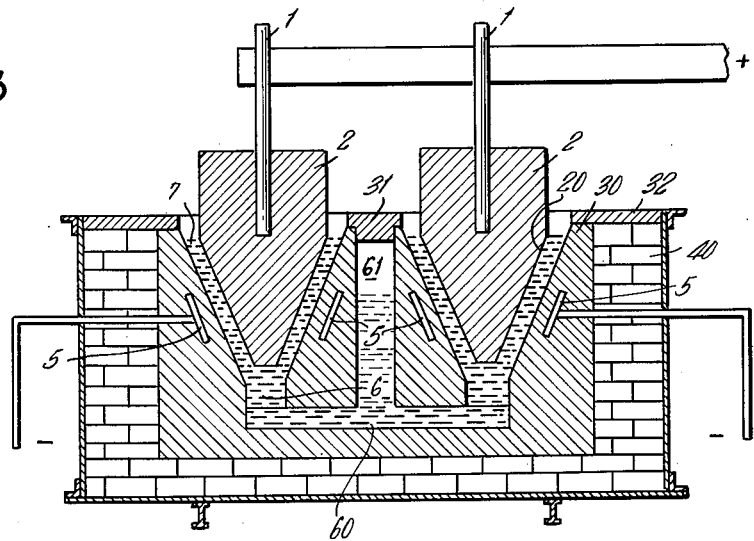
Figure 4:
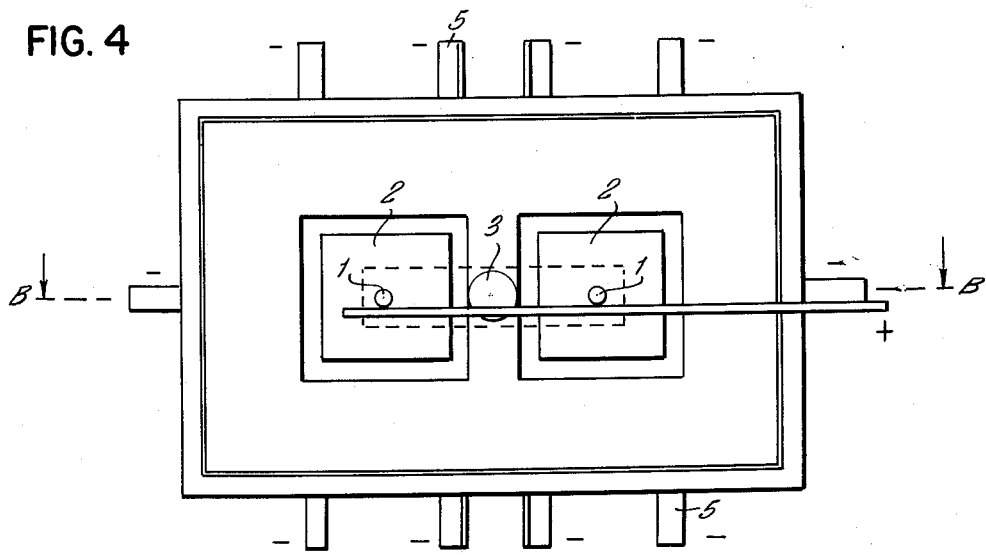
Figure 5:
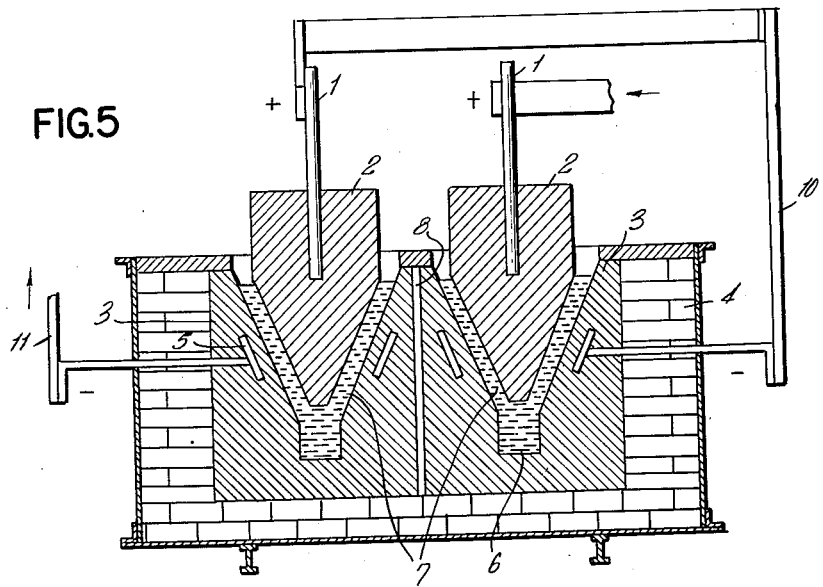
Figure 6:
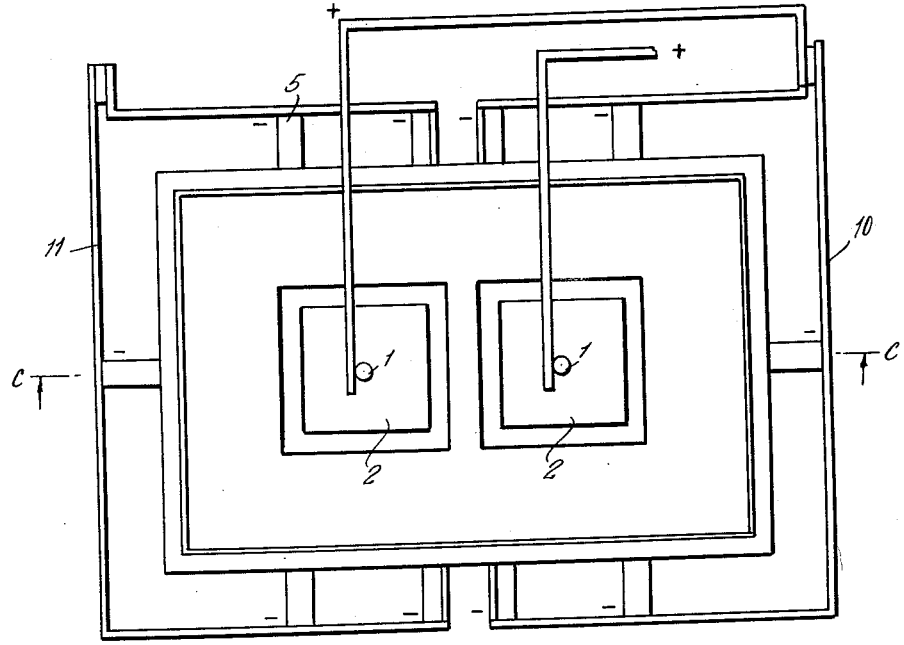
Figure 7:
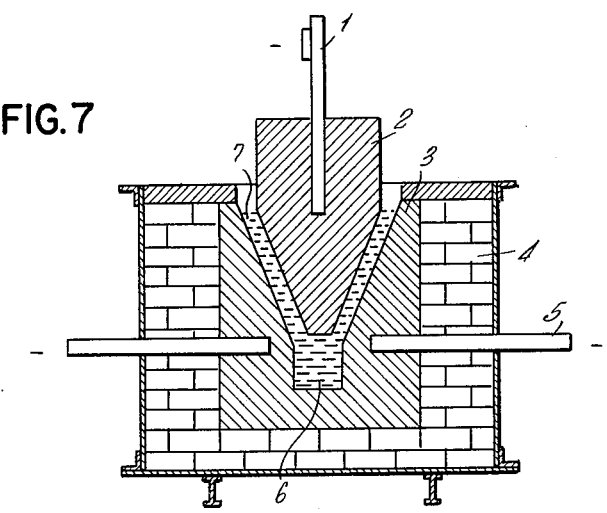
Figure 9:
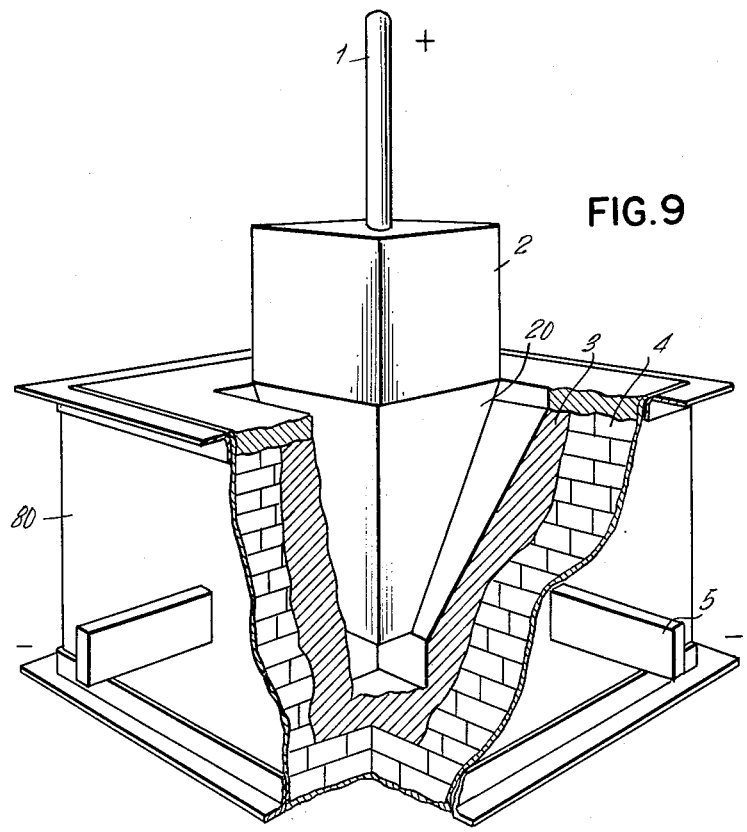

Preferred embodiments of the invention are illustrated diagrammatically in the drawings, in which FIG. 1 is a vertical section of a single-cell furnace having a cathode graphite vessel and a pyramidal anode, FIG. 2 is a top view of the furnace of FIG. 1, FIG. 2 is a vertical section of a furnace having multiple anodes of the kind shown in FIGS. 1 and 2, again employing a massive, unitary cathode graphite vessel, the anodes being in parallel, FIG. 4 is a top view of the furnace of FIG. 3, FIG. 5 is a vertical section of a multi-cell furnace with individual cells similar to those of FIGS. 1 and 2, the cells being electrically connected in series and being arranged in one single furnace, FIG. 6 is a top view of the furnace of FIG. 5, FIG. 7 is a vertical section of a furnace with multiple prismatic anodes in a massive graphite vessel, FIG. 8 is a top view of the furnace of FIG. 7, FIG. 9 is a perspective view of the furnace of FIG. 1.

The respective vertical sections are taken along the planes A—A, B—B, C—C, D—D indicated in FIGS. 2, 4, 6, and 8.

FIG. 10 shows a conventional device for adjusting the height of the anodes continuously, as applied to the furnace of FIG. 9.

Corresponding parts bear identical or similar reference numerals. In FIGS. 1 and 9, 1 designates the current-carrying conductor tip of the adjustable anode, 2 is the anode, 3 the massive graphite cathode vessel, made, for example, of electrographite, 4 is the refractory, 5 are the current-carrying iron stubs for the cathode, 6 is the sump for collecting the metallic aluminum produced, 7 is the inter-electrodic space occupied by the bath, and 80 is the outer housing.

The frusto-pyramidal shape of the lower part 20 of the anode 2 is shown by the perspective view provided by FIG. 9. Although this shape is preferred, other shapes suitable for carrying out the main purpose described above will be obvious. The opposite, flat, parallel, planar surfaces of the anodic and cathodic walls can be replaced by parallel curved walls employing circular, elliptic, or oval arcs, or by conical surfaces. The section shown in FIG. 1 can obviously also be taken as the section of coaxial conical cathodic and anodic surfaces.

It is understood, in each of the figures, that conventional raising and lowering devices, shown in numerous patents in this field, can be used to raise and to lower the anode or anodes 2.

In FIG. 3, which illustrates a parallel arrangement of cathodes and two anodes, are shown two anodes 2 each having a lower frusto-pyramidal portion 20, the four inclined anodic surfaces of each of which face the corresponding upwardly facing inclined cathodic surfaces of the unitary, massive graphite cathode vessel 30. The aluminum produced collects in the sumps 6 which are connected by conduit 60. The aluminum is removed from the well 61 in the usual manner and by the usual means, after lifting the refractory lid 31, which forms part of refractory top 32. The massive, unitary graphite cathode 30 thus provides a total of eight upwardly-downwardly directed, upwardly facing, inclined cathodic walls which face the corresponding walls of the two anodes. Embedded in the cathode are the current-carrying iron stubs 5. As shown in FIG. 4, stubs 5 extend outwardly of the furnace walls. Note also FIGS. 2, 6, 8, and 10.

In FIGS. 5 and 6 is illustrated a series arrangement of two cells, each being similar to that shown in FIGS. 1 and 9, but arranged in a single furnace. The current enters right anode 2 through conductor 1, and then passes through the right cell and thence through conductor 10 to the second cell, at the left, from which the current passes out through conductor 11 at the left. In FIGS. 5 and 6 an electrically insulating partition 8 is added between the adjacent cathodes 3 of the multi-cell furnace. The furnace of FIG. 10 corresponds to that illustrated in FIG. 9. A horizontal bar 85 supports the anode stub 1 through a clamp 84 permitting height adjustment of the anode. The bar is carried by two screw posts 81, each of which is provided with an anode-raising and lowering gear 86.

The current feed, the methods and means for electric connections and the conduction, starting, the $Al_2O_3$ feed and tapping of the produced molten aluminum, the adjustment of the inter-electrodic distance, the anodic integration or anodic replacement from the top (the anodes being pre-baked or made of self-baking Soederberg paste), are entirely analogous to the arrangements known and employed in the conventional type of furnace at present used for industrial purposes and described above. The same is true for the material used for the current-carrying stubs, and the bars, refractory and insulating materials, etc. except for the cathode which as stated above is a massive graphite vessel. Hence, those parts which do not fall within the bounds of the invention proper have not been fully illustrated in the drawings, which are schematic, for the purpose of simplicity and clarity.

There now follows a non-limitative example of furnace performance according to the present invention, referring particularly to the furnace shown in FIGS. 3 and 4, but which is equally valid for the type shown in FIGS. 5 and 6.

The cells have the following features:

| | |
|---|---|
| Bath | Cryolite and alumina. |
| Average current | 1000 a. |
| Anodic density | 0.7 a./cm.$^2$. |
| Cathodic density | 0.4 a./cm.$^2$. |
| Interpolar distance | 4–7 cm. |
| Total average voltage | 5 v. |
| Electrolysis voltage | 4 v. |
| Average temperature | 950–970° C. |
| Current yield | 80–90%. |

Specific energy consumption—from 16.7 to 18.7 including the external drops; from 13.3 to 15 without the external drops.

The cell consists of a monoblock vessel with a length double the top width and three times the bottom width.

Inner vessel dimensions: | Mm.
--- | ---
Length | 400
Depth | 260
Top width | 200
Bottom width | 100

It therefore has the interior shape of a frusto-right-pyramid with the smaller base below and the sides inclined at about 80° sub-horizontal.

The ratio between the areas of the top and bottom surfaces of the frusto-pyramids, forming both the cathode and the anode, is between 0.1 and 0.5. The ratio between the height and the major base is between 0.3 and 1.3.

The vessel was made from an electrographite cylinder (450 mm.) It was flattened on both sides so as to give the outer surface an approximate rectangular prismatic shape. No auxiliary A.C. heating was applied to this cell. Convention cells with equal capacity never consume less than 18–20 kw. hr./kg. Al, even under ideal operating conditions.

The invention also includes embodiments which fall within its broad scope although involving only a partial application of its principles. It includes a furnace having a massive cathodic graphite vessel and a prismatic cavity, the vertical section of which is again substantially V-shaped, or trapezoidal, and with its greater base at top, the anode or anodes being aligned and of a convex shape corresponding to the form of said prismatic cavity. In such case, the heads of the anode or aligned anodes and the respective vessel walls are vertical instead of being inclined.

Another embodiment provides aligned anodes with vertical faces turned towards each other, while at both ends of the row of the anodic elements, the sides, and respective vessel walls, are inclined according to the principle of this invention. In such case, only the vertical anodic sides facing each other do not take part in the electrolysis, whereas all other advantages of the invention remain unchanged, namely, this embodiment has the substantial advantage that all other anodic sides do function as anodic surfaces in the electrolysis.

I claim:

1. A furnace for electrolysis of aluminum compounds dissolved in a molten salt bath, for production of aluminum, characterized in that the electrolysis chamber of the cell is constituted by a massive graphite cathode formed in the shape of a vessel having inclined inner cathodically active graphite walls tapering inwardly and downwardly around the entire inner circumference of the cathode, and anode means providing at least one carbon anode having its anodically active surface tapering inwardly and downwardly over the entire circumference of the anode, to provide an upwardly-downwardly extending, annular electrolysis gap between said cathode and anode, and electric conductor stubs connected to said anode and cathode.

2. A furnace for electrolysis of aluminum compounds dissolved in a molten salt bath, for production of aluminum, comprising a carbon anode and a graphite cathode, the cathode comprising a mass of graphite having an upwardly opening cavity formed therein, thus providing an electrolysis vessel adapted for containing the molten salt bath, said cavity having a cathodically active graphite wall surface over its entire lateral circumference, the cavity tapering downwardly and inwardly over its entire circumference to form an inclined cathode wall surface extending about the entire circumference, a vertically adjustable carbon anode extending downwardly within said cavity, and having an anodically active surface tapering downwardly and inwardly around its entire circumference, so as to provide an upwardly-downwardly extending, annular electrolysis gap between said cathode and anode, electric conductors connected to the cathode and anode, a sump formed in the block below the anode, for collecting aluminum, the sump forming a continuation of the cavity, the sump having a narrow upper inlet opening the cross section of which is a minor fraction of the maximum horizontal cross section of the respective anodically active anode, so that at least the major part of the electrolysis current passes laterally across the upwardly-downwardly extending annular electrolysis gap.

3. An electrolytic furnace for production of aluminum by electrolysis of an oxide of aluminum in a bath of a fused salt, the furnace comprising a refractory structure, a cathode structure comprising a vessel formed of a massive unitary parallelepiped block of graphite supported within said refractory structure, the cathode graphite block having formed therein a cavity providing an electrolysis chamber the graphite walls of which extend upwardly-downwardly and entirely about the circumference of that chamber, a carbon anode supported within the electrolysis chamber, the anodic surface and the cathodic surface being in substantial parallelism, the anode providing anodically active surface over its entire circumference, the furnace being adapted to contain the molten bath between the cathodic and anodic surfaces, the cavity and the anode being frusto-pyramidal in shape, tapering downwardly, the area of the lower end of each frusto-pyramid being from about 0.1 to 0.5 times that of the upper end, a sump below the anode for collecting aluminum, the sump communicating with the lower end of the cavity.

4. A furnace for electrolysis of an aluminum compound dissolved in a molten salt bath, for production of aluminum, comprising a carbon anode and a graphite cathode, the cathode comprising a massive block of graphite rectangular in vertical and horizontal section, the block having an upwardly opening pyramidal cavity formed therein, providing an electrolysis vessel adapted for containing the molten salt bath, said cavity having a cathodically active graphite wall surface over its entire circumference, the cavity having four walls sloping downwardly and inwardly to form an upwardly facing inclined graphite cathode wall surface extending about the entire circumference, a vertically adjustable pyramidal carbon anode extending downwardly within said cavity and having an anodically active surface around its entire circumference, the anode having four walls sloping downwardly and inwardly, the respective cathode and anode walls being disposed facing each other so as to provide an upwardly-downwardly extending, annular electrolysis gap between said cathode and anode, electric conductors connected to the cathode and anode, a sump formed in the block below the anode, for collecting aluminum, the sump forming a continuation of the cavity, the sump having a narrow upper inlet opening the cross section of which is a minor fraction of the maximum horizontal cross section of the respective anodically active anode, so that at least the major part of the electrolysis current passes laterally across the upwardly-downwardly extending annular electrolysis gap.

5. An electrolytic furnace for production of aluminum by electrolysis of an oxide of aluminum in a molten cryolitic bath, the furnace comprising a refractory structure, a cathode structure comprising a unitary vessel of graphite supported within said refractory structure, current-carrying conductors embedded in the vessel, the vessel providing a lower sump portion for collecting aluminum produced in the process, the cathode graphite vessel having formed therein a cavity providing an electrolysis chamber the graphite walls of which taper downwardly on all sides toward the sump, a carbon anode having a downwardly tapering surface over its entire circumference, the tapering anode surface and the convergent cathodic surface being in substantial parallelism, so that the carbon anode is active in the electrolysis over its circumference, the furnace being adapted to contain the molten bath between the cathodic and anodic surfaces, the aluminum collecting sump portion being below the lower end of the anode, the surface areas of the opposed inclined cathodic and anodic active surfaces each being greater than the top horizontal cross-sectional area of the aluminum collecting sump portion and greater than the surface area of the anode facing said sump portion, so that at least the major part of the electrolysis current flows through the opposed inclined cathodic and anodic surfaces.

6. An electrolytic furnace for production of aluminum by electrolysis of an oxide of aluminum in a molten cryolitic bath, the furnace comprising a refractory structure, a cathode structure comprising a unitary vessel of graphite supported within said refractory structure, current-carrying conductors embedded in the vessel, the vessel providing a lower sump portion for collecting aluminum produced in the process, the cathode graphite vessel having a cavity formed therein providing an electrolysis chamber the graphite walls of which taper downwardly on all sides toward the sump, a carbon anode having a downwardly tapering surface over its entire circumference, the tapering anode surface and the convergent cathodic surface being in substantial parallelism, so that the carbon anode is active in the electrolysis over its entire circumference, the furnace being adapted to contain the molten bath between the cathodic and anodic surfaces, the aluminum collecting sump portion being below the lower end of the anode, the surface areas of the opposed inclined cathodic and anodic active surfaces each being greater than the top horizontal cross-sectional area of the aluminum collecting sump portion and greater than the surface area of the anode facing said sump portion, so that at least the major part of the electrolysis current flows through the opposed inclined cathodic and anodic surfaces, the said carbon anode and the said inner graphite walls of the cathode each being pyramidal.

7. An electrolytic furnace for production of aluminum by electrolysis of an oxide of aluminum in a molten cryolitic bath, the furnace comprising a refractory structure, a cathode structure comprising a unitary vessel of graphite supported within said refractory structure, current-carrying conductors embedded in the vessel, the vessel providing a lower pump portion for collecting aluminum produced in the process, the cathode graphite vessel having a cavity formed therein providing an electrolysis chamber the graphite walls of which taper downwardly on all sides toward the sump, a carbon anode having a downwardly tapering surface over its entire circumference, the tapering anode surface and the convergent cathodic surface being in substantial parallelism, so that the carbon anode is active in the electrolysis over its circumference, the furnace being adapted to contain the molten bath between the cathodic and anodic surfaces, the aluminum collecting sump portion being below the lower end of the anode, the surface areas of the opposed inclined cathodic and anodic active surfaces each being greater than the top horizontal cross-sectional area of the aluminum collecting sump portion and greater than the surface area of the anode facing said sump portion, so that at least the major part of the electrolysis current flows through the opposed inclined cathodic and anodic surface, the said carbon anode and the said inner graphite walls being frusto-conical.

8. An electrolytic furnace for production of aluminum by electrolysis of an oxide of aluminum in a molten cryolitic bath, the furnace comprising a refractory structure, a cathode structure comprising a vessel of graphite supported within said refractory structure, current-carrying conductors embedded in the vessel, the vessel providing a lower sump portion for collecting aluminum produced in the process, the cathode graphite vessel having a cavity formed therein providing an electrolysis chamber the graphite walls of which taper downwardly on all sides toward tht sump, a carbon anode having a downwardly tapering surface over its entire circumference, the tapering anode surface and the convergent cathodic surface being in substantial parallelism, so that the carbon anode is active in the electrolysis over its entire circumference, the furnace being adapted to contain the molten bath between the cathodic and anodic surfaces, the aluminum collecting sump portion being below the lower end of the anode, the surface areas of the opposed inclined cathodic and anodic active surfaces each being greater than the top horizontal cross-sectional area of the aluminum collecting sump portion and greater than the surface area of the anode facing said sump portion, so that at least the major part of the electrolysis current flows through the opposed inclined cathodic and anodic surfaces, the said carbon anode and the said inner graphite walls of the cathode each being frusto-pyramidal, the ratio between the areas of the bases thereof being between 0.1 and 0.5, and the ratio between the height and the area of the larger base being between 0.3 and 1.3.

9. A multi-cell furnace for electrolysis of an aluminum compound dissolved in a molten salt bath, for production of aluminum, comprising a massive block structure of graphite rectangular in vertical and horizontal cross section, a refractory structure in which said block is seated, said block structure having a plurality of upwardly opening pyramidal cavities formed therein for containing molten salt bath, the cavities each having four walls sloping downwardly and inwardly to form an upwardly facing inclined graphite cathode wall surface extending about the entire horizontal circumference, a pyramidal carbon anode extending downwardly within each cavity and having an anodically active carbon surface around its entire horizontal circumference, the anodes each having four walls sloping downwardly and inwardly, the respective cathode and anode walls facing each other, so as to provide an upwardly-downwardly extending annular electrolysis gap between each cathode and anode, a sump formed in said graphite block below each anode for reception of molten aluminum, a passage formed in said block and connecting two sumps for removal of aluminum, and an upwardly extending well formed in said block and connected to said passage for common collection of aluminum from said sumps, electric conductor means connecting the anodes and cathodes in parallel, the sumps each having a narrow inlet opening the cross-sectional area of which is a minor fraction of the maximum horizontal cross section of the respective anodically active anode, so that the major part of the electrolysis current passes laterally across the upwardly-downwardly extending annular electrolysis gap.

References Cited in the file of this patent

UNITED STATES PATENTS

| 1,012,470 | Steinbuch | Dec. 19, 1911 |
| 2,859,160 | Helling | Nov. 4, 1958 |
| 2,959,533 | De Varda | Nov. 8, 1960 |

FOREIGN PATENTS

| 574,002 | Canada | Apr. 14, 1959 |
| 784,695 | Great Britain | Oct. 16, 1957 |